United States Patent
Jones et al.

(10) Patent No.: US 7,019,050 B2
(45) Date of Patent: Mar. 28, 2006

(54) ALTERNATE DISPERSANTS FOR SPRAY-DRIED CONCENTRATE COMPONENTS

(75) Inventors: Frank R. Jones, Port St. Lucie, FL (US); Stanley A. McIntosh, Greensboro, NC (US); Gary W. Shore, Anderson, SC (US)

(73) Assignee: BASF Corporation, Florham Park, NJ (US)

( * ) Notice: Subject to any disclaimer, the term of this patent is extended or adjusted under 35 U.S.C. 154(b) by 245 days.

(21) Appl. No.: 10/613,677

(22) Filed: Jul. 3, 2003

(65) Prior Publication Data

US 2004/0059048 A1 Mar. 25, 2004

Related U.S. Application Data

(60) Provisional application No. 60/395,208, filed on Jul. 11, 2002.

(51) Int. Cl.
*C08K 9/04* (2006.01)
*C09B 67/08* (2006.01)

(52) U.S. Cl. ............... 523/205; 523/206; 523/342; 523/348; 523/351; 106/412; 106/413; 428/407

(58) Field of Classification Search ............... 523/205, 523/206, 342, 348, 351
See application file for complete search history.

(56) References Cited

U.S. PATENT DOCUMENTS

| | | | | |
|---|---|---|---|---|
| 4,089,699 | A | * | 5/1978 | Blackburn et al. .......... 523/200 |
| 4,670,181 | A | * | 6/1987 | Mollinger et al. .......... 524/317 |
| 5,633,295 | A | * | 5/1997 | Higgs ........................ 523/205 |
| 5,670,561 | A | | 9/1997 | Scheibelhoffer et al. |
| 5,800,746 | A | | 9/1998 | Jones et al. |
| 5,833,893 | A | | 11/1998 | Jones et al. |
| 5,834,089 | A | | 11/1998 | Jones et al. |
| 5,889,089 | A | | 3/1999 | Caswell et al. |
| 5,955,516 | A | | 9/1999 | Caswell et al. |
| 6,232,371 | B1 | | 5/2001 | Caswell et al. |

\* cited by examiner

*Primary Examiner*—Matthew A. Thexton
(74) *Attorney, Agent, or Firm*—Fernando A. Borrego

(57) ABSTRACT

Concentrates and method of making concentrates are disclosed. The concentrates may be incorporated into thermoformable articles as a concentrate powder or as a paste. Thermoformable articles, such as fibers, containing the concentrates and methods of making the thermoformable articles are also disclosed.

21 Claims, No Drawings

ALTERNATE DISPERSANTS FOR SPRAY-DRIED CONCENTRATE COMPONENTS

This application claims priority to Provisional Application Ser. No. 60/395,208 filed on Jul. 11, 2002.

FIELD OF THE INVENTION

The present invention is directed to concentrates and articles made therefrom. The present invention is also directed to a method of making concentrates and articles containing the same.

BACKGROUND OF THE INVENTION

The incorporation of additives into "neat" thermoplastic polymeric host materials (i.e., polymeric materials containing no additives) so as to achieve desired physical properties is well known. For example, it is well known to incorporate additives such as colorants, stabilizers, delusterants, flame retardants, fillers, antimicrobial agents, antistatic agents, optical brighteners, extenders, processing aids and other functional additives into polymeric host materials in an effort to "engineer" desired properties of the resulting additive-containing polymeric host material. Such additives are typically added prior to shaping the polymeric material, for example, prior to spinning or molding (e.g., extrusion, injection, or blow-molding) operations.

Conventional methods of incorporating additives into a neat thermoplastic polymeric material have a number of shortcomings including, but not limited to, (1) inadequate distribution of the additive within the thermoplastic polymeric material, and (2) the inability to incorporate a desired amount of additive into the thermoplastic polymeric material without adding an undesirable amount of dispersing agent into the thermoplastic polymeric material. Efforts continue in an attempt to incorporate a desired amount of additive into a thermoplastic polymeric material while optimizing the distribution of the additive within the thermoplastic polymeric material and minimizing the amount of dispersing agent added to the thermoplastic polymeric material.

What is needed in the art is an improved method of incorporating additives into a neat thermoplastic polymeric material.

SUMMARY OF THE INVENTION

The present invention addresses some of the difficulties and problems discussed above by the discovery of an improved method of incorporating additives into a neat thermoplastic polymeric material wherein the method comprises forming a concentrate having a desired amount of additive dispersed within a desired minimal amount of dispersing agent. The concentrate may then be incorporated into a neat thermoplastic polymeric material or alternatively formed into a paste, which may subsequently be incorporated into a neat thermoplastic polymeric material.

Accordingly, the present invention is directed to a concentrate comprising a desired amount of additive material in combination with one or more dispersing agents, wherein the amount of dispersing agents is at a desirable minimal level. The present invention is also directed to a method of making the concentrates.

The present invention is also directed to a paste comprising the concentrate and one or more carrier materials. The present invention is further directed to a method of making a paste, and a method of incorporating concentrate or paste into a neat thermoplastic polymeric material.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

Various terms are used to describe aspects of the present invention. A number of terms are defined as follows:

As used herein, the term "concentrate" is used to refer to a chemical composition comprising at least one additive and at least one dispersing agent, wherein the additive is dispersed throughout a matrix of the dispersing agent(s). Concentrates may be present in particulate or powder form.

As used herein, the term "additive" is used to refer to any material that may be added to a polymer melt in order to provide a desired property to the thermo-formed polymer melt. Exemplary additives include, but are not limited to, dyes, pigments, stabilizers, delusterants, flame-retardants, fillers, anti-microbial agents, anti-static agents, optical brighteners, extenders, and processing aids. Suitable additives may include liquid or solid materials.

As used herein, the term "dispersing agent" is used to refer to a material for coating and encapsulating additive material. Typically, the dispersing agent comprises a polymeric material.

As used herein, the term "carrier material" is used to refer to a material for coating and encapsulating powder concentrate. The carrier material may be used to form a liquid or paste containing the concentrate.

The present invention provides an improved method of making a concentrate, wherein the concentrate comprises a desired amount of one or more additives dispersed within a desired amount of one or more dispersing agents. The resulting concentrate possesses an exceptional distribution of additive material(s) within a matrix of one or more dispersing agents. Further, the resulting concentrate has a desirable average particle size, which enables the use of the concentrate in a number of thermoforming processes such as extrusion, molding, etc. The method may further include a step of forming a paste from the resulting concentrate, wherein the concentrate is combined and dispersed within a carrier material. The resulting paste may be further processed in a variety of thermoforming processes.

The present invention provides a powder concentrate or paste, which may be incorporated into a neat thermoplastic polymeric material to form a thermoplastic polymeric material having desired properties. The present invention also provides thermoformable articles, such as fibers, films and molded objects, formed from the powder concentrate and one or more thermoplastic polymers. Various aspects of the present invention are described in detail below.

I. Concentrates

The present invention is directed to concentrates comprising one or more additives dispersed within one or more dispersing agents. The following materials may be used to form the concentrates of the present invention.

A. Additives

The concentrates of the present invention contain at least one additive. Suitable additives for use in the present invention include, but are not limited to, pigments, dyes, other colorants, stabilizers, delusterants, flame-retardants, inorganic fillers, anti-microbial agents, anti-static agents, optical brighteners, extenders, processing aids, or any combination thereof. In one desired embodiment of the present invention, the additive comprises at least one colorant, such as a dye or pigment. The choice of a given additive or combination of additives depends on a number of factors including, but not limited to, the desired function of the concentrate (i.e., color, flame-resistance, etc.), the desired particle size of the concentrate, and the concentration of additive(s) within the concentrate.

In one embodiment of the present invention, the additive comprises one or more colorants (i.e., dyes, pigments, inorganic materials) in the form of solid particulate material. The colorant remains in a solid phase when subjected to elevated melt-processing temperatures of a thermoplastic polymeric material. Although a variety of colorants may be used in the present invention, desirably the colorant is a particulate colorant having a mean particle size of less than about 10 microns (µm), more desirably less than about 3 µm, and even more desirably less than about 1 µm.

The concentrates of the present invention may comprise a relatively large weight percent (wt %) of one or more additives dispersed within one or more dispersing agents. Desirably, the concentrate of the present invention comprises at least about 50 wt % of one or more additives based on the total weight of the concentrate. More desirably, the concentrate of the present invention comprises at least about 55 wt %, 60 wt %, 65 wt %, 70 wt %, 75 wt %, and even more desirably, at least about 80 wt % additive based on the total weight of the concentrate.

B. Dispersing Agents

The concentrates of the present invention also contain at least one dispersing agent in addition to the additive(s) described above. Suitable dispersing agents include, but are not limited to, copolymers of ethylene and acrylic acid monomers, block copolymers of ethylene oxide and propylene oxide, and combinations thereof. Other suitable dispersing agents that may be used in combination with ethylene acrylic acid copolymers include, but are not limited to, various anionic and non-ionic surfactants, such as, alkylphenolic ethoxalates, saponified fatty acids, and fatty acid sulfates. Suitable copolymers of ethylene and acrylic acid include, but are not limited to, copolymers containing from about 10 to about 30 wt % acrylic acid based on the total weight of the copolymer. More desirably, the copolymer of ethylene and acrylic acid comprises about 20 wt % acrylic acid based on a total weight of the copolymer. Desirably, the ethylene acrylic acid copolymer possesses the following physical properties as shown in Table 1 below.

TABLE 1

Physical Properties of Desired Ethylene/Acrylic Acid Copolymers

| Physical Property | Approximate Value | Test Method |
|---|---|---|
| Wt % Acrylic Acid | 10 to 30 | Direct titration |
| Melt index, g/10 min. | 250 to 350 | ASTM D 1238 |
| Melt flow rate, g/10 min. | 10 to 30 | ASTM D 1238 |
| Density, g/cc. | 0.94 to 0.97 | ASTM D 792 |
| Vicat softening point ° F. (° C.) | 100 to 120 (38 to 49) | ASTM D 1525 |

Commercially available ethylene/acrylic acid copolymers suitable for use in the present invention include, but are not limited to, the PRIMACOR™ family of copolymers, available from Dow Chemical Company (Midland, Mich.). One particularly suitable copolymer for use in the present invention is PRIMACOR™ 5980I, which has physical properties as shown in Table 2 below.

TABLE 2

Physical Properties of PRIMACOR™ 5980I

| Physical Property | Value | Test Method |
|---|---|---|
| Wt % Acrylic Acid | 20.5 | Direct titration[1] |
| Melt index, g/10 min. | 300 | ASTM D 1238 |
| Melt flow rate, g/10 min. | 13.8 | ASTM D 1238 |
| Density, g/cc. | 0.958 | ASTM D 792 |
| Vicat softening point ° F. (° C.) | 108 (42) | ASTM D 1525 |

Suitable block copolymers of ethylene oxide and propylene oxide for use in the present invention include, but are not limited to, block copolymers of ethylene oxide and propylene oxide having the formula as shown below:

wherein v, x, y and z each independently represent a number ranging from 0 to about 40, wherein either v or z equals 0. Desirably, v, x, y and z each independently represent a number ranging from about 10 to about 30, wherein either v or z equals 0. In one desired embodiment, the sum of v and y is equal to about 42 when z equals 0.

Commercially available block copolymers of ethylene oxide and propylene oxide suitable for use in the present invention include, but are not limited to, the PLURONIC® family of copolymers available from BASF Corporation (Mount Olive, N.J.). Desirably, the block copolymer comprises PLURONIC® 25R2, an ethylene oxide propylene oxide copolymer comprising (i) about 20 wt % ethylene oxide, based on a total weight of the copolymer, and (ii) combined propylene oxide blocks having an approximate molecular weight of the combined blocks of about 2500.

Other suitable dispersing agents may be used alone or in combination with the ethylene acrylic acid copolymers and the block copolymers of ethylene oxide and propylene oxide described above including, but not limited to, various anionic and non-ionic surfactants. Commercially available anionic and non-ionic surfactants suitable for use in the present invention include, but are not limited to, TRITON® surfactants available from Rohm & Haas (Glen Allen, Va.), and TETRONIC surfactants, available from BASF Corporation (Mount Olive, N.J.).

The concentrate of the present invention desirably comprises less than about 50 wt % of one or more dispersing agents based on a total weight of the concentrate. More desirably, the concentrate of the present invention comprises less than 45 wt %, 40 wt %, 35 wt %, 30 wt %, 25 wt %, and even more desirably, less than 20 wt %, based on a total weight of the concentrate.

In one desired embodiment of the present invention, the concentrate comprises from about 50 to about 98 wt % of one or more additives, and from about 2 to about 50 wt % of one or more dispersing agents. More desirably, the concentrate of the present invention comprises from about 65 to about 95 wt % of one or more additives, and from about 5 to about 35 wt % of one or more dispersing agents. In one desired embodiment, the concentrate of the present invention comprises greater than 75 wt % of one or more additives, and less than 25 wt % of one or more dispersing agents.

In a further desired embodiment of the present invention, the concentrate comprises (a) from about 50 to about 98 wt % of an additive; (b) from about 5.0 to about 30.0 wt % of PRIMACOR™ 5980I; and (c) from about 5.0 to about 10.0 wt % of PLURONIC® 25R2; wherein the weight percent of each of (a), (b), and (c) is based on a total weight of the powder concentrate. More desirably, the concentrate comprises (a) from about 65 to about 85 wt % of a colorant; (b) from about 10.0 to about 30.0 wt % of PRIMACOR™ 5980I; and (c) from about 6.0 to about 8.0 wt % of PLURONIC® 25R2; wherein the weight percent of each of (a), (b), and (c) is based on a total weight of the powder concentrate.

II. Method of Making Concentrates

The present invention is also directed to a method of making concentrates. The method of making concentrates may comprise one or more of the following steps: a dispersion forming step, a stirring step, a milling step, and a spray-drying step. In one embodiment of the present invention, the method comprises (a) forming an aqueous dispersion containing at least one additive and one or more dispersing agents, wherein at least one dispersing agent comprises a first copolymer of ethylene and acrylic acid monomers; and (b) spray drying the dispersion to form a powder concentrate. In a further embodiment of the present invention, the method comprises steps (a) and (b) above and further comprises (i) stirring the dispersion in a mixer; and (ii) processing the stirred dispersion through a milling apparatus to form a milled dispersion prior to the spray drying step, step (b). The stirring step may be for any desired length of time, but typically lasts from about ½ hour to an hour. Numerous commercially available mixers may be used to perform this step.

The aqueous dispersion may be subjected to one or more passes through a milling apparatus. Desirably, the resulting milled dispersion comprises a dispersion of particles, wherein less than about 2.0 weight percent of the particles have a particle size greater than 2 microns. More desirably, the resulting milled dispersion comprises a dispersion of particles, wherein less than about 1 weight percent of the particles in the milled dispersion have a particle size greater than about 2 microns. Suitable milling apparatus that may be used in the present invention include, but are not limited to, a Chicago Boiler Company Model KDL pilot Dyno Mill containing 1200 ml of 1 mm glass beads.

In one embodiment of the present invention, the milling step comprises the following steps: (a) passing a stirred dispersion through a milling apparatus during a first pass and removing a first liter of the dispersion that passes through the milling apparatus during the first pass to form a first pass milled dispersion; (b) passing the first pass milled dispersion through the milling apparatus during a second pass and removing a first liter of the dispersion that passes through the milling apparatus during the second pass to form a second pass milled dispersion; and (c) passing the second pass milled dispersion through the milling apparatus during a third pass and removing a first liter of the dispersion that passes through the milling apparatus during the third pass to form a third pass milled dispersion. In this embodiment, the first liter removed during the second and third pass may be recycled through the milling apparatus to produce the final milled dispersion, which may be processed in a spray-dryer.

The method of making a concentrate also includes a spray-drying step. The spray-drying step removes the aqueous component from the aqueous dispersion to form a final concentrate comprising at least one additive and at least one dispersing agent as described above. The resulting concentrate granules are in powder form and desirably have an average particle size of less than about 2.0 microns (μm). More desirably, the resulting concentrate granules have an average particle size of less than about 1.0 μm. The concentrate granules may be used as is or may be further processed by mixing the concentrate granules with a carrier material to form a paste or chips.

Processing conditions within the spray-dryer may vary depending on a number of factors including, but not limited to, the degradation temperature of the dispersion components, the water content of the aqueous dispersion, and the desired rate of production of the concentrate granules. In one embodiment of the present invention, a spray-drying step is used, wherein the spray drying step comprises processing the dispersion through a dryer having an inlet temperature of from about 160° C. to about 240° C., an outlet temperature of from about 65° C. to about 120° C., an atomizer running at from about 21,000 to about 27,000 revolutions per minute, and a spray-drying rate of from about 5 to about 40 pounds of concentrate per hour. In a further embodiment of the present invention, a spray-drying step is used, wherein the spray-drying step comprises processing the dispersion through a dryer having an inlet temperature of about 220° C., an outlet temperature of about 90° C., an atomizer running at about 24,350 revolutions per minute, and a spray-drying rate of about 25 pounds of concentrate per hour.

III. Method of Making Pastes or Chips from Concentrates

The above-described concentrates may be further processed into pastes or chips. Typically, the concentrate powder is incorporated into a carrier material, such as a polymeric carrier material. The carrier material can be any material that is liquid at or below a thermoforming temperature (i.e., melt-spinning or extrusion temperature) of a polymeric host material. Suitable carrier materials include, but are not limited to, polyamides, polyesters, or a combination thereof. Some commercially available carrier materials for use in the present invention include, but are not limited to, TONE® polyols available from Dow Chemical Company (Midland, Mich.); EURELON polyamide resin available from Shering (Berlin, Germany) (now available under the trade designation AZAMIDE™ from Resolution Performance Products (Houston, Tex.)); VESTAMELT copolyamides from Huls America Inc. (Piscataway, N.J.); ELVAMIDE® polyamide polymers available from DuPont Co. (Wilmington, Del.); and PLATAMID® polyamide copolymers available from ATOFINA Chemicals, Inc. (Philadelphia, Pa.).

Desirably, the carrier material is a polyamide or polyester, which is compatible with the thermoplastic polymeric host material. For example, when a concentrate paste is incorporated into a nylon-6 polymeric host material, the desired carrier is polycaprolactone. Carrier materials, which may be liquefied at elevated temperatures (e.g., less than about 200° C.), may also be used in the present invention. For example, when a concentrate paste is incorporated into a nylon-6 polymeric host material, it is also possible to use copolyamides having a melting point of less than about 200° C. One desired class of such copolyamides is commercially available under the trade designation VESTAMELT copolyamides from Huls America Inc. (Piscataway, N.J.), with VESTAMELT 722 being particularly desired.

In one embodiment of the present invention, the method of making a paste comprises mixing concentrate particles with one or more carrier materials as described above. The paste components may be mixed by combining concentrate particles and one or more carrier materials in a high-intensity mixer such as a Henschel FM series mixer commercially available from Henschel Mixers America, Inc. (Houston, Tex.). If desired, the mixture may then be milled to obtain a paste, which can be introduced directly into a melt of a polymeric host material.

The paste desirably has a viscosity during introduction into a polymeric host material ranging from about 500 cP to about 500,000 cP, and more desirably from about 1,500 cP to about 100,000 cP, at a temperature between about 20° C. to about 200° C. The paste may be maintained to within a desirable viscosity range by application of heat (e.g., by keeping the paste in a suitable storage vessel, which is jacketed with electrical resistance heaters and/or a heat transfer medium).

The paste or chips desirably contain concentrate particles in an amount of from about 5 to about 75 wt %, more desirably from about 10 to about 65 wt % based on a total weight of the paste or chip, with the remainder representing one or more carrier materials. The paste (or chip) is typically incorporated into a polymeric host material at levels between about 0.01 to about 15 wt %, more desirably between about 0.05 and 10.0 wt % based on a total weight of the polymeric host material and the paste (or chip).

IV. Method of Making Thermoformable Products from Concentrates

The above-described concentrates and pastes and/or chips made therefrom may be incorporated into a variety of products. The concentrates and pastes of the present invention are particularly suitable for incorporation to a host polymeric material, which may be thermoformed into a film, fiber, molded object, or any other thermoformable article. Suitable host polymeric materials include, but are not limited to, polyamides such as poly(hexamethylene adipamide), polycaprolactam and polyamides of bis(4-aminocyclohexyl) methane and linear aliphatic dicarboxylic acids containing 9, 10 and 12 carbon atoms; copolyamides; polyesters such as poly(ethylene)terephthalic acid and copolymers thereof; polyolefins such as polyethylene and polypropylene; and polyurethanes. Both heterogeneous and homogeneous mixtures of such polymers may also be used.

The concentrates and pastes (or chips) of the present invention may be incorporated into a host polymeric material using any process known in the art. Suitable methods of incorporating concentrate and/or paste (or chips) into a host polymeric material include, but are not limited to, the methods disclosed in U.S. Pat. No. 5,800,746 to Jones et al. and U.S. Pat. No. 5,889,089 to Caswell et al.; the entire content of both of which is expressly incorporated hereinto by reference.

In one desired embodiment of the present invention, the concentrates and/or pastes are incorporated into a host polymeric material to form continuous fibers. Desirably, the concentrate and/or paste (or molten chips) is introduced directly into a polymer melt at a location downstream of a polymer melt filter, but upstream of a spinneret. In this manner, a relatively quick additive change between successive batches of filaments may be possible (i.e., to allow for changes in additive recipe to be realized from one filament batch to another). In addition, such an inlet location for the concentrate and/or paste (or chips) also allows for a wide range of processing flexibility to be achieved. For example, the concentrate and/or paste (or chips) may be mixed with the entire polymeric host material supplied so that all of the filaments have the same color. Alternatively, the concentrate and/or paste (or chips) may be mixed with a portion of the total flow of polymeric host material to achieve, for example, multiple differently colored filament groups, which may remain segregated to form single color yarns or may be combined to form multicolor yarns, such as in a heather yarn.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of a Perylene Red Spray-Dried Concentrate

A dispersion containing 20 wt % Perylene Red, 5.44 wt % PRIMACOR® 5980I, 2 wt % PLURONIC® 25R2, and 72.56 wt % water was prepared in the following manner. Dry pigment was added incrementally to a mixture composed of 25 wt % PRIMACOR® 5980I aqueous solution, PLURONIC® 25R2 and water, and stirred with a Cowles mixer for one hour.

The dispersion was then passed through a Chicago Boiler Company Model KDL Pilot Dyno Mill containing 1200 ml of 1 mm glass beads at 250–300 mil/min. The first liter through the mill was discarded. The dispersion was passed through the mill two more times under the same conditions. The first liter through the mill on the second and third passes was recycled through the mill.

Particle size measurements were made on a Coulter LS230 particle size analyzer. Less than 2 wt % of the particles had a particle size above 2 microns.

The milled dispersion was processed on a Niro Utility Dryer with 220° C. inlet temperature, 90° C. outlet temperature, and the atomizer running at 24,350 revolutions per minute. The resulting spray-dry rate produced approximately 25 pounds per hour of spray-dried Perylene Red concentrate.

The resulting pigment concentrate contained 72.9 wt % pigment.

EXAMPLE 2

Preparation of a Phthalocyanine Green Spray-Dried Concentrate

A dispersion containing 20 wt % Phthalocyanine Green, 2.5 wt % PRIMACOR® 5980I, 2 wt % PLURONIC® 25R2, and 75.5 wt % water was prepared in the following manner. Dry pigment was added incrementally to a mixture composed of 25 wt % PRIMACOR® 5980I aqueous solution, PLURONIC® 25R2 and water, and stirred with a Cowles mixer for one hour.

The dispersion was then passed through a Chicago Boiler Company Model KDL Pilot Dyno Mill containing 1200 ml of 1 mm glass beads at 250–300 ml/min. The first liter through the mill was discarded. The dispersion was passed through the mill two more times under the same conditions. The first liter through the mill on the second and third passes was recycled through the mill.

Particle size measurements were made on a Coulter LS230 particle size analyzer. Less than 1 wt % of the particles had a particle size above 2 microns.

The milled dispersion was processed on a Niro Utility Dryer with 220° C. inlet temperature, 90° C. outlet temperature, and the atomizer running at 24,350 revolutions per minute. The resulting spray-dry rate produced approximately 25 pounds per hour of spray-dried Phthalocyanine Green concentrate.

The resulting pigment concentrate contained 81.6 wt % pigment.

EXAMPLE 3

Preparation of a Phthalocyanine Blue Spray-Dried Concentrate

A dispersion containing 20 wt % Phthalocyanine Blue, 8 wt % PRIMACOR® 5980I, 2 wt % PLURONIC® 25R2 and 70 wt % water was prepared in the following manner. Dry pigment was added incrementally to a mixture composed of 25 wt % PRIMACOR® 5980I aqueous solution, PLURONIC® 25R2 and water and stirred with a Cowles mixer for one hour.

The dispersion was then passed through a Chicago Boiler Company Model KDL Pilot Dyno Mill containing 1200 ml of 1 mm glass beads at 250–300 ml/min. The first liter through the mill was discarded. The dispersion was passed through the mill two more times under the same conditions. The first liter through the mill on the second and third passes was recycled through the mill.

Particle size measurements were made on a Coulter LS230 particle size analyzer. Less than 5 wt % of the particles had a particle size above 2 microns.

The milled dispersion was processed on a Niro Utility Dryer with 220° C. inlet temperature, 90° C. outlet temperature, and the atomizer running at 24,350 revolutions per minute. The resulting spray-dry rate produced approximately 25 pounds per hour of spray-dried Phthalocyanine Blue concentrate.

The resulting pigment concentrate contained 66.7% pigment.

EXAMPLE 4

Preparation of a Paste Containing Phthalocyanine Blue Spray-Dried Concentrate and Nylon Filaments Therefrom A blue additive concentrate paste was formed by direct blending of 48 wt % of concentrate particles formed in Example 3, and 52 wt % polycaprolactone. The resulting paste was preheated to approximately 140° C. and exhibited a viscosity of from about 2000 to 4000 cP. The paste was pumped directly into a spin pack assembly at a location downstream of a polymer filter, but upstream of the spinneret orifices (58 hole asymmetrical trilobal) on an assembly as described in and as shown in FIG. 1 of U.S. Pat. No. 5,889,089 to Caswell et al. The additive concentrate paste was mixed with a nylon-6 polymeric host material within the spin pack assembly at a rate of between about 6.0 g/min (to obtain about 0.8–1.1 wt. % pigment in the resulting melt-spun filaments) to about 7.3 g/min (to obtain about 1.1–1.5 wt. % pigment in the resulting melt-spun filaments). The resulting melt-spun filaments had a uniformly colored appearance along the lengthwise extent as viewed with an unaided eye. Microscopic views of filament cross-sections revealed that substantially homogenous to somewhat striated mixing had occurred in dependence upon the injection rate of the additive paste.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of making a powder concentrate comprising:
   forming an aqueous dispersion containing at least one additive and one or more dispersing agents, wherein at least one dispersing agent comprises a first copolymer of ethylene and acrylic acid monomers; and
   spray drying the dispersion to form the powder concentrate.

2. The method of claim 1, further comprising:
   stirring the dispersion in a mixer for at least ½ hour to form a stirred dispersion; and
   processing the stirred dispersion through a milling apparatus to form a milled dispersion prior to the spray drying step.

3. The method of claim 2, wherein the milling step comprises:
   passing the stirred dispersion through the milling apparatus during a first pass to form a first pass milled dispersion;
   removing a sample of the first pass milled dispersion;
   passing the first pass milled dispersion through the milling apparatus during a second pass to form a second pass milled dispersion;
   removing a sample of the second pass milled dispersion;
   passing the second pass milled dispersion through the milling apparatus during a third pass to form a third pass milled dispersion; and
   removing a sample of the third pass milled dispersion.

4. The method of claim 2, wherein the milled dispersion contains particles, wherein less than about 2.0 weight percent of the particles have a particle size greater than 2 microns.

5. The method of claim 1, wherein the spray drying step comprises processing the dispersion through a dryer having an inlet temperature of about 220° C., an outlet temperature of about 90° C., an atomizer running at about 24,350 revolutions per minute, and a spray drying rate of about 25 pounds of concentrate per hour.

6. The method of claim 1, wherein the aqueous dispersion comprises (a) up to about 25 wt % of a colorant; (b) from about 2.0 to about 10.0 wt % of a first copolymer of ethylene and acrylic acid, wherein the first copolymer contains about 20.5 wt % acrylic acid, based on a total weight of the first copolymer; and (c) from about 1.0 to about 5.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500; wherein the weight percent of each of (a), (b), and (c) is based on a total weight of the aqueous dispersion.

7. The method of claim 6, wherein the aqueous dispersion comprises (a) about 20 wt % of a colorant; (b) from about 2.0 to about 8.0 wt % of a first copolymer of ethylene and acrylic acid, wherein the first copolymer contains about 20.5 wt % acrylic acid, based on a total weight of the first copolymer, and (c) about 2.0 wt % of a block copolymerr of ethylene oxide and propylene oxide, wherein the block copolymer contains about 20.0 wt % ethylene oxide, based on a total weight of the second copolymer, and contains propylene blocks having a combined molecular weight of about 2500; wherein the weight percent of each of (a), (b), and (c) is based on a total weight of the aqLLCOUS dispersion.

8. The method of claim 1, wherein the powder concentrate comprises (a) from about 50 to about 98 wt % of a colorant; (b) from about 5.0 to about 30.0 wt % of a first copolymer of ethylene and acrylic acid, wherein the first copolymer contains about 20.5 wt % acrylic acid, based on a total weight of the first copolymer; and (c) from about 5.0 to about 10.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500; wherein the weight percent of each of (a), (b), and (c) is based on a total weight of the powder concentrate.

9. The method of claim 8, wherein the powder concentrate comprises (a) from about 65 to about 85 wt % of a colorant; (b) from about 10.0 to about 30.0 wt % of a first copolymer of ethylene and acrylic acid, wherein the first copolymer contains about 20.5 wt % acrylic acid, based on a total weight of the first copolymer; and (c) from about 6.0 to about 8.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500; wherein the weight percent of each of(a), (b), and (c) is based on a total weight of the powder concentrate.

10. A method of making a paste comprising:
forming a mixture comprising the concentrate formed in the method of claim 1 and at least one carrier material.

11. A powder concentrate formed from the method of claim 1.

12. A powder concentrate comprising:
(a) from about 50 to about 98 wt % of at least one additive;
(b) from about 5.0 to about 30.0 wt % of a first copolymer of ethylene and acrylic acid, wherein the first copolymer contains about 20.5 wt % acrylic acid, based on a total weight of the first copolymer; and
(c) from about 5.0 to about 10.0 wt % of a block copolymer of ethylene oxide and propylene oxide having a structure as shown below:

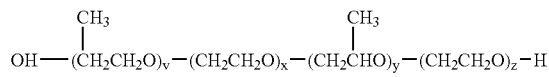

wherein v, x, y and z each independently represent a number ranging from 0 to about 40, either v or z equals 0.

the block copolymer contains about 20.0 wt % ethylene oxide, based on a total weight of the block conolymer, and contains propylene blocks having a combined molecular weight of about 2500, and
wherein the weight percent of each of (a), (b), and (c) is based on a total weight of the powder concentrate.

13. A paste comprising:
the powder concentrate of claim 12; and
at least one carrier material.

14. The powder concentrate of claim 12, wherein the powder concentrate comprises
(a) from about 65 to about 85 wt % of a colorant;
(b) from about 10.0 to about 30.0 wt % of a first copolymer of ethylene and acrylic acid, wherein the first copolymer contains about 20.5 wt % acrylic acid, based on a total weight of the first copolymer; and
(c) from about 6.0 to about 8.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500;
wherein the weight percent of each of (a), (b), and (c) is based on a total weight of the powder concentrate.

15. The powder concentrate of claim 12, wherein the powder concentrate comprises
(a) greater than 75 wt % of a colorant;
(b) from about 80 to about 16.0 wt % of a first copolymer of ethylene and acrylic acid, wherein the first copolymer contains about 20.5 wt % acrylic acid, based on a total weight of the first copolymer; and
(c) from about to to about 4 to 10.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500;
wherein the weight percent of each of (a), (b), and (c) is based on a total weight of the powder concentrate.

16. The powder concentrate of claim 12, wherein the powder concentrate has an average particle size of less than about 2.0 microns.

17. The powder concentrate of claim 12, wherein the powder concentrate consists essentially of:
(a) from about 50 to about 98 wt % of an additive;
(b) from about 5.0 to about 30.0 wt % of a first copolymer of ethylene and acrylic acid, wherein the first copolymer contains about 20.5 wt % acrylic acid, based on a total weight of the first copolymer; and
(c) from about 5.0 to about 10.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500;
wherein the weight percent of each of (a), (b), and (c) is based on a total weight of the powder concentrate.

18. The powder concentrate of claim 17, wherein the powder concentrate consists essentially of:
(a) from about 65 to about 85 wt % of a colorant;

(b) from about 10.0 to about 30.0 wt % of a first copolymer of ethylene and acrylic acid, wherein the first copolymer contains about 20.5 wt % acrylic acid, based on a total weight of the first copolymer; and (c) from about 6.0 to about 8.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500;

wherein the weight percent of each of (a), (b), and (c) is based on a total weight of the powder concentrate.

19. The powder concentrate of claim 12, wherein the powder concentrate consists essentially of:

(a) greater than 75 wt % of a colorant;

(b) from about 8.0 to about 16.0 wt % of a first copolymer of ethylene and acrylic acid, wherein the first copolymer contains about 20.5 wt % acrylic acid, based on a total weight of the first copolymer; and (c) from about 4.0 to about 10.0 wt % of a block copolymer of ethylene oxide and propylene oxide, wherein the block copolymer contains about 20.0 wt % ethylene oxide, based on a total weight of the second copolymer, and contains propylene blocks having a combined molecular weight of about 2500;

wherein the weight percent of each of (a), (b), and (c) is based on a total weight of the powder concentrate.

20. The powder concentrate of claim 12, wherein v, x, y and z each independently represent a number ranging from about 10 to about 30, and wherein either v or z equals 0.

21. The powder concentrate of claim 12, wherein the sum of v and y is equal to about 42 and z equals 0.

* * * * *